US010346228B2

(12) United States Patent
Ramanath et al.

(10) Patent No.: US 10,346,228 B2
(45) Date of Patent: Jul. 9, 2019

(54) METHOD AND SYSTEM FOR DEVIATION DETECTION IN SENSOR DATASETS

(71) Applicants: Vinay Ramanath, Karnataka (IN); Asmi Rizvi Khaleeli, Karnataka (IN); Gaurav Hegde, Karnataka (IN)

(72) Inventors: Vinay Ramanath, Karnataka (IN); Asmi Rizvi Khaleeli, Karnataka (IN); Gaurav Hegde, Karnataka (IN)

(73) Assignee: Siemens Aktiengesellschaft, München (DE)

( * ) Notice: Subject to any disclaimer, the term of this patent is extended or adjusted under 35 U.S.C. 154(b) by 169 days.

(21) Appl. No.: 15/647,847

(22) Filed: Jul. 12, 2017

(65) Prior Publication Data

US 2019/0018722 A1 Jan. 17, 2019

(51) Int. Cl.

| | |
|---|---|
| ***G06F 11/00*** | (2006.01) |
| ***G06F 17/18*** | (2006.01) |
| ***G06N 3/02*** | (2006.01) |
| ***G05B 23/02*** | (2006.01) |

(52) U.S. Cl.

CPC ........ *G06F 11/006* (2013.01); *G05B 23/0254* (2013.01); *G06F 17/18* (2013.01); *G06N 3/02* (2013.01); *G06F 2201/81* (2013.01)

(58) Field of Classification Search

CPC ......... G06F 11/006; G06F 17/18; G06N 3/02; G05B 23/0254

See application file for complete search history.

(56) References Cited

U.S. PATENT DOCUMENTS

| | | | |
|---|---|---|---|
| 7,020,595 B1 | 3/2006 | Adibhatla et al. | |
| 8,762,106 B2 | 6/2014 | Miller | |
| 8,996,334 B2 | 3/2015 | Trejo Sanchez et al. | |
| 2006/0047512 A1 | 3/2006 | Yuan | |
| 2006/0074598 A1 * | 4/2006 | Emigholz ............. | C10G 47/36 702/185 |
| 2008/0027678 A1 | 1/2008 | Miller | |
| 2008/0167839 A1 | 7/2008 | Miller | |

(Continued)

FOREIGN PATENT DOCUMENTS

WO WO2017116627 A1 7/2017

OTHER PUBLICATIONS

PCT International Written Opinion of the International Searching Authority dated Oct. 31, 2018, for corresponding PCT/EP2018/068902.

(Continued)

*Primary Examiner* — Joshua P Lottich

(74) *Attorney, Agent, or Firm* — Lempia Summerfield Katz LLC

(57) ABSTRACT

A system, device, and method of deviation detection in at least one sensor dataset associated with one or more sensors in a technical system are provided. The method includes generating a best fit model of the technical system based on a target sensor dataset. The method also includes predicting a sensor dataset of the target sensor using the best fit model and non-target sensor datasets of non-target sensors, and determining a deviation tolerance by determining a difference between the predicted sensor dataset and the target sensor dataset. The method also includes detecting deviation in actual sensor dataset of the target sensor when a data-point in the actual sensor dataset exceeds the deviation tolerance and detecting deviation in the at least one sensor dataset of the one or more sensors by detecting deviation in each of the non-target sensor datasets.

22 Claims, 10 Drawing Sheets

(56) References Cited

U.S. PATENT DOCUMENTS

| | | | | |
|---|---|---|---|---|
| 2009/0132095 | A1 | 5/2009 | Sekiai et al. | |
| 2011/0202488 | A1 | 8/2011 | Yuan | |
| 2011/0290331 | A1* | 12/2011 | Burrows | E03B 7/02 137/14 |
| 2011/0320167 | A1* | 12/2011 | Budiman | A61B 5/14532 702/179 |
| 2013/0204808 | A1 | 8/2013 | Jiang et al. | |
| 2015/0235143 | A1* | 8/2015 | Eder | G16H 50/50 706/12 |
| 2016/0116378 | A1 | 4/2016 | Bates et al. | |
| 2017/0102978 | A1 | 4/2017 | Pallath et al. | |

OTHER PUBLICATIONS

Baqqar, Mabrouka, et al. "A general regression neural network model for gearbox fault detection using motor operating parameters." IEEE, pp. 584-588 (2012).

Hawkins, Simon, et al. "Outlier detection using replicator neural networks." International Conference on Data Warehousing and Knowledge Discovery. Springer, Berlin, Heidelberg, pp. 170-180 (2002).

Specht, Donald, "A General Regression Neural Network," IEEE Transactions on Neural Networks, vol. 2, No. 6, pp. 568-576 (1991).

Upadhyaya, Belle R., et al., "Application of Neural Networks for Sensor Validation and Plant Monitoring," Nuclear Technology, vol. 97, pp. 170-176 (1992).

Murphy, Robert A., "A Neural Network Anomaly Detector Using the Random Cluster Model," pp. 1-11 (2015).

Murphree, Jerry, "Machine Learning Anomaly Detection in Large Systems," IEEE, pp. 1-9, (Sep. 2016).

* cited by examiner

METHOD AND SYSTEM FOR DEVIATION DETECTION IN SENSOR DATASETS

BACKGROUND

The present embodiments relate generally to automatically determining error condition in sensors provided in a technical system.

Currently, almost every technical system is equipped with an operational data extraction system using a network of sensors placed across the system for diagnostic and prognostic applications. The sensors are provided for online monitoring as well as offline analytics; therefore, sensor data is expected to be without anomalies or deviations from anticipated trends.

Accordingly, sensor data-points are to be identified in the sensor data having an anomalous nature that cannot be accounted for by change in process of the technical system. In other words, the sensor data-points that are affected by sensor malfunctions and/or environmental interferences are to be identified. Further, in case of scarceness of the sensor data, an additional challenge is that the identified sensor data-points may often be a false positive.

SUMMARY AND DESCRIPTION

The scope of the present invention is defined solely by the appended claims and is not affected to any degree by the statements within this summary.

In one embodiment, a method for detecting deviation in one or more sensor datasets associated with multiple sensors in a technical system is provided. The sensors may be classified as a target sensor and non-target sensors. The method includes receiving a target sensor dataset associated with the target sensor in time series and generating a best fit model of the technical system based on the target sensor dataset. Further, the method includes predicting a sensor dataset of the target sensor using the best fit model and non-target sensor datasets of non-target sensors and determining a deviation tolerance by determining a difference between the predicted sensor dataset and the target sensor dataset. The method also includes detecting deviation in an actual sensor dataset of the target sensor when a data-point in the actual sensor dataset exceeds the deviation tolerance. The method also includes detecting deviation in the at least one sensor dataset of the one or more sensors by detecting deviation in each of the non-target sensor datasets.

Additionally, the method includes determining a deviation periodicity in the sensor dataset of the sensors and a sample period for each of the sensors. The deviation periodicity and the sample period are used to predict a subsequent deviation in the sensor dataset. Further, the method includes determining a target sensitivity of the target sensor by performing a perturbation analysis on the target sensor dataset based on each of the non-target sensor datasets.

In accordance with another embodiment, a deviation detection device for detecting deviation in one or more sensor datasets of a plurality of sensors in a technical system is provided. The device includes a receiver, one or more processors, and a memory. The memory includes modules that are executed by the one or more processors. The modules include a model generator to generate a best fit model of the technical system based on the target sensor dataset. A prediction module predicts a sensor dataset of the target sensor using the best fit model and non-target sensor datasets of non-target sensors. A tolerance module determines a deviation tolerance by determining a difference between the predicted sensor dataset and the target sensor dataset. A sensor deviation detector detects deviation in an actual sensor dataset of the target sensor when a data-point in the actual sensor dataset exceeds the deviation tolerance. A system deviation detector detects deviation in the one or more sensor datasets by detecting deviation in each of the non-target sensor datasets.

In accordance with yet another embodiment, a system for detecting deviation in one or more sensor datasets is provided. The system includes a server operable on a cloud computing platform, a network interface communicatively coupled to the server, and one or more technical systems communicatively coupled to the server via the network interface. The server includes a deviation detection device for detecting deviation in the sensor datasets associated with at least one sensor in the one or more technical systems.

DETAILED DESCRIPTION

Figure 1A:
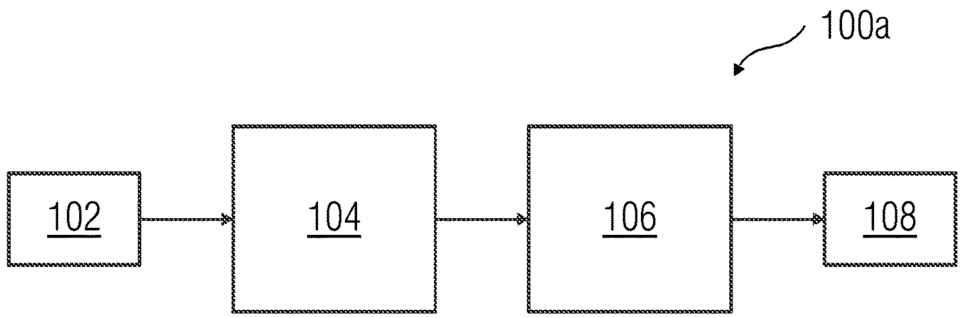
FIG. 1A illustrates a model-fitting phase according to an embodiment.

Various embodiments are described with reference to the drawings, where like reference numerals are used to refer to like elements throughout. In the following description, a large gas turbine has been considered as an example of a technical system for the purpose of explanation. Numerous specific details are set forth in order to provide thorough understanding of one or more embodiments. These examples are not to be considered to limit the application of the invention to large gas turbines. One or more of the present embodiments may be applied for any technical system for which a sensor frozen period is automatically determined. Such embodiments may be practiced without these specific details.

As used herein, the term "dataset"/"datasets" refers to data that a sensor records. The data recorded by the sensor is for a particular period of time. In one or more of the present embodiments, the sensor records the data in a time series. The dataset includes multiple data points, each representing a recording of the electronic device. As used herein, "sensor value" and "data point" are used interchangeably to be a representation of one or more datums recorded for the at least one operative parameter associated with the technical system. The "at least one operation parameter" refers to one or more characteristics of the technical system. For example, if a gas turbine is the technical system, the at least one operation parameter includes combustion temperature, inlet pressure, exhaust pressure, etc.

Further, "target sensor" refers to one of a plurality of sensors that is used as input data or training data to determine a system model. The remaining sensors of the plurality of sensors are referred to as "non-target sensors". The data-points generated by the target sensor are referred to as "target sensor dataset", which is used as training data to generate a system model and a best fit model. The data-points generated by the non-target sensors are referred to as "non-target sensor dataset", which is used to predict sensor dataset of the target sensor. The term "actual sensor dataset" of the target sensor refers to data-points on which deviation is detected. The "actual sensor dataset" and the "target sensor dataset" are both generated from the target sensor; however, the "target sensor dataset" is the training data used to build the system model while "actual sensor dataset" is the data with potential deviation. During the implementation of one or more of the present embodiments, a target sensor may be changed to a non-target sensor and vice versa.

FIG. 1A illustrates a model-fitting phase 100A according to an embodiment. The model fitting phase 100A is to train a neural network model on a training data 102 supplied. The training data 102 relates to a target sensor dataset associated with a target sensor. For example, considering a gas turbine as the technical system, the target sensor may be an exhaust temperature sensor. The training data 102 used for the model fitting phase 100A is analyzed for anomalies using known anomaly detection methods involving adaptive whiskers and Local Outlier Probability estimation.

The training data 102 is used to generate a system model 104. The system model 104 is of one hidden layer with neurons adaptive to the training data 102. In an exemplary embodiment, the system model 104 is a list of an artificial neural network model, which is an object returned by a nnet function.

On the system model 104, a regression model 106 is applied. In an embodiment, a projection pursuit regression 106 determines projections that fit the system model 104 the best. After application of the regression model, a best fit model 108 is generated from the system model 104. Due to scarcity and inherent nature of randomness in the training data 102, anomalous data-points in the training data 102 tend to have minimal implications on the best fit model 108. The best fit model 108 is used in a deviation detection phase, as detailed in FIG. 1B.

Figure 1B:
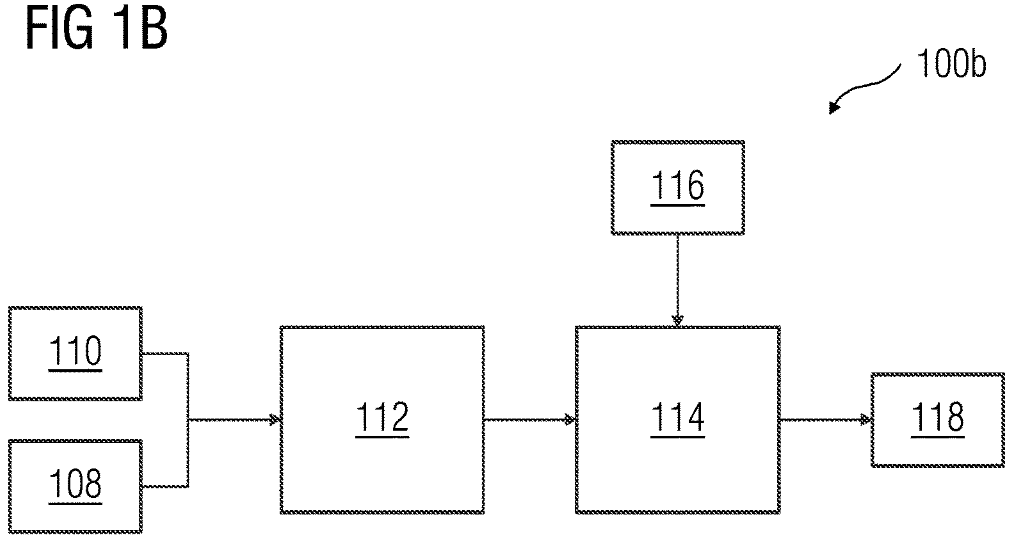
FIG. 1B illustrates a deviation detection phase according to an embodiment.

FIG. 1B illustrates the deviation detection phase 100B according to an embodiment. The best fit model 108 and non-target sensor datasets 110 are used to predict sensor dataset 112 of the target sensor. The predicted sensor dataset 112 is determined based on a deterministic function between the non-target sensors and the target sensors, as the sensors are related to each other by laws of physics. The predicted sensor dataset 112 is compared with the target sensor dataset to determine a deviation tolerance 114. An actual sensor dataset 116 associated with the target sensor is compared with the deviation tolerance 114 to detect sensor deviation 118 for the target sensor. Sensor deviation for all the sensors in the technical system is aggregated to determine system deviation for the technical system.

For example, the predicted sensor dataset 112 is generated for the target sensor for a period of January 1 to February 28 based on the non-target sensor datasets from January 1 to February 28. The predicted sensor dataset 112 is then compared with the target sensor dataset from January 1 to February 28 to determine the deviation tolerance 114. Further, the actual sensor dataset 116 of the target sensor for a period of March 1 to April 30 is compared with the deviation tolerance 114 to determine whether the actual sensor dataset 116 exceeds the deviation tolerance 114 at each time instant. When data-points in the actual sensor dataset 116 exceeds the deviation tolerance 114 at a given time instance, then the deviation is detected in the target sensor dataset.

Figure 2:
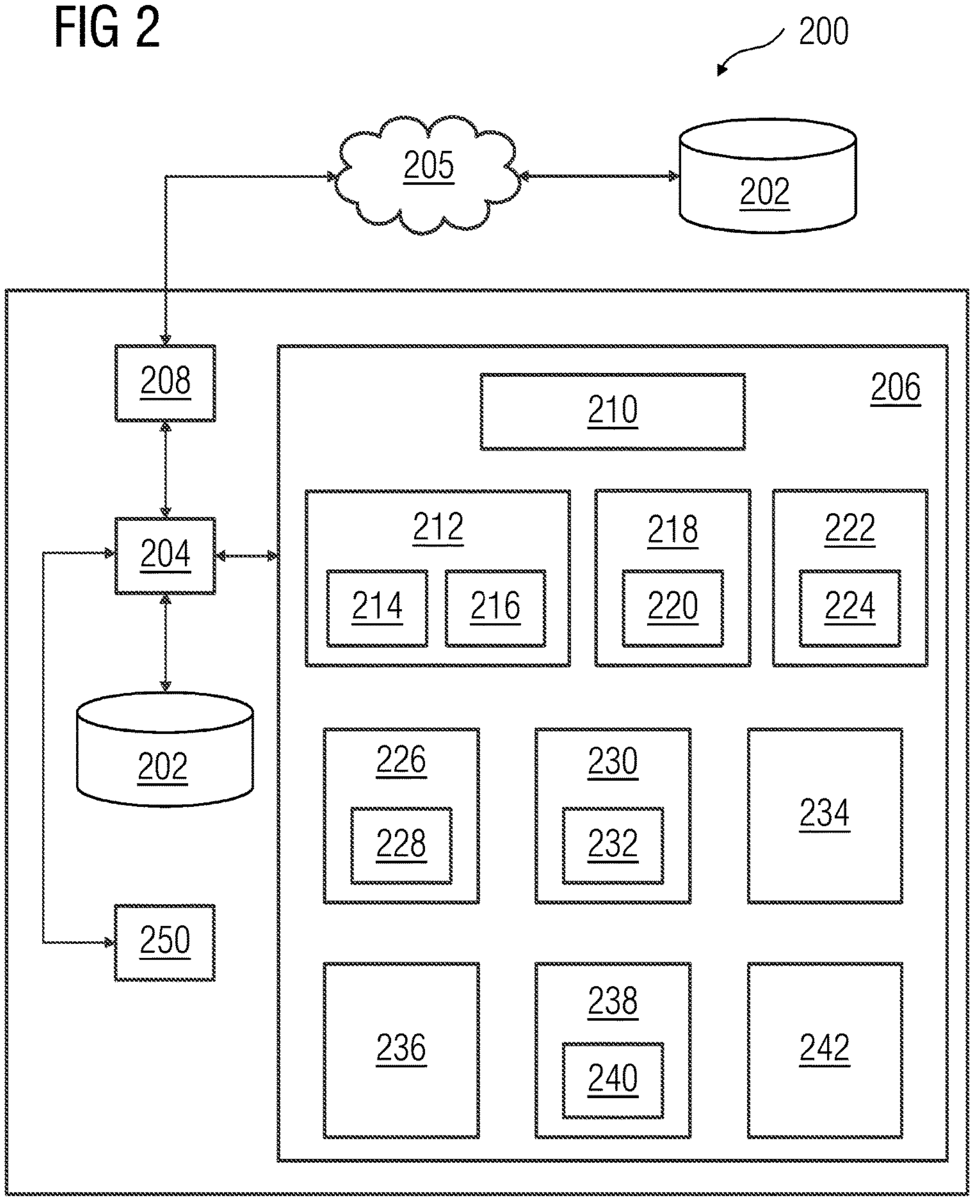
FIG. 2 is a block diagram of one embodiment of a deviation detection device.

The model fitting phase and deviation detection phase is implemented via a deviation detection device. FIG. 2 is a block diagram of a deviation detection device 200 according to one or more of the present embodiments. The deviation detection device 200 detects deviation in one or more sensor datasets associated with one or more sensors in a technical system. The technical system used for explaining is a large gas turbine. However, the technical system is not limited to a large gas turbine and may include any system with multiple sensors. The deviation detection device 200 according to one or more of the present embodiments is installed on and accessible by a user device (e.g., a personal computing device, a workstation, a client device, a network enabled computing device, any other suitable computing equipment, and combinations of multiple pieces of computing equipment). The deviation detection device 200 disclosed herein is in operable communication with a database 202 over a communication network 205.

The database 202 is, for example, a structured query language (SQL) data store or a not only SQL (NoSQL) data store. In an embodiment of the database 202 according to one or more of the present embodiments, the database 202 may also be a location on a file system directly accessible by the deviation detection device 200. In another embodiment of the database 202, the database 202 is configured as a cloud based database implemented in a cloud computing environment, where computing resources are delivered as a service over the network 205. As used herein, "cloud computing environment" refers to a processing environment including configurable computing physical and logical resources (e.g., networks, servers, storage, applications, services, etc.) and data distributed over the network 205 (e.g., the Internet). The cloud computing environment provides on-demand network access to a shared pool of the configurable computing physical and logical resources. The communication network 205 is, for example, a wired network, a wireless network, a communication network, or a network formed from any combination of these networks.

In one embodiment, the deviation detection device 200 is downloadable and usable on the user device. In another embodiment, the deviation detection device 200 is configured as a web based platform (e.g., a website hosted on a server or a network of servers). In another embodiment, the deviation detection device 200 is implemented in the cloud computing environment. The deviation detection device 200 is developed, for example, using Google App engine cloud infrastructure of Google Inc., Amazon Web Services® of Amazon Technologies, Inc., as disclosed hereinafter in FIG. 4. In an embodiment, the deviation detection device 200 is configured as a cloud computing based platform implemented as a service for analyzing data.

The deviation detection device 200 disclosed herein includes a memory 206 and at least one processor 204 communicatively coupled to the memory 206. As used herein, "memory" refers to all computer readable media (e.g., non-volatile media, volatile media, and transmission media except for a transitory, propagating signal). The memory is configured to store computer program instructions defined by modules (e.g., elements 210, 212, 218, 222, etc.) of the deviation detection device 200. The processor 204 is configured to execute the defined computer program instructions in the modules. The processor 204 is configured to execute the instructions in the memory 206 simultaneously. As illustrated in FIG. 1, the deviation detection device 200 includes a communication unit 208 including a receiver to receive the sensor dataset in time series, and a display unit 160. Additionally, a user using the user device may access the deviation detection device 200 via a graphic user interface (GUI). The GUI is, for example, an online web interface, a web based downloadable application interface, etc.

The modules executed by the processor 204 include a training data module 210, a model generator 212, a prediction module 218, a tolerance module 222, a sensor deviation module 226, a system deviation module 230, a period generator 234, a sampling module 236, a deviation predictor 238, and a sensitivity module 242.

The training data module 210 removes anomalies in a target sensor dataset associated with a target sensor known anomaly detection methods involving adaptive whiskers and Local Outlier Probability estimation. The model generator 212 includes a system model generator 214 to generate a system model from the target sensor dataset. The model generator 212 also includes a best fit model generator 216 to generate a best fit model from the system model using projection pursuit regression.

The prediction module 218 predicts a sensor dataset of the target sensor using the best fit model and the non-target sensor dataset. The prediction module 218 includes a matrix module 220 to determine dot-products of non target data-points, in the non-target sensor datasets, with weight of the best fit model. The dot-product dataset is the predicted sensor dataset of the target sensor.

The predicted sensor dataset is compared with the target sensor dataset to determine a deviation tolerance. This is performed using the tolerance module 222 that includes a subtractor 224. The subtractor 224 determines the difference between predicted data-points in the predicted sensor dataset with target data-points in the target sensor dataset for each time instant. Therefore, the deviation tolerance is a dataset of the difference between the predicted data-points and the target data-points determined for each time instant.

The deviation tolerance is used to determine deviation in an actual dataset of the target sensor by the sensor deviation module 226. The sensor deviation module 226 includes a comparator 228 to determine whether the data-point in the actual sensor dataset exceeds the deviation tolerance at a given time instant. When the data-point exceeds the deviation tolerance, deviation in the actual sensor dataset is detected.

Deviation in the non-target sensor datasets is determined by considering each of the non-target sensors as the target sensor and iteratively executing the instructions in the modules 210 to 226. The system deviation module 230 includes a deviation aggregator module 232 that iteratively detects deviation in each of the non-target sensor datasets by considering the non-target sensors as the target sensor. The deviation aggregator module 232 generates a union of all the deviations from the sensors in the technical system to give an aggregated report of all anomalies present in the one or more datasets associated with the operation of the technical system. FIGS. 5, 6, 7A, 7B and 7C illustrate exemplary operation of the deviation detection device 200.

The deviation detection device 200 may also predict a subsequent deviation that may occur in the sensor dataset. To predict the subsequent deviation, the device 200 includes the period generator 234, the sampling module 236, and the deviation predictor 238. The period generator 234 determines a deviation periodicity in the sensor datasets of the one or more sensors in the technical system. The sampling module 236 determines a sample period for each of the one or more sensors. The deviation predictor 238 includes a correlation module 240 to determine a circular correlation plot for the sensor dataset and determine whether the deviation periodicity falls on a hill or a valley of the circular correlation plot. If the deviation periodicity falls on the hill, the deviation periodicity is true; if the deviation periodicity falls on the valley, the deviation periodicity is false. The method used to predict the subsequent deviation is further elaborated in FIG. 9.

The deviation detection device 200 may also determine the sensitivity of the target sensor with respect to changes in the non-target sensor. The sensitivity module 242 performs a perturbation analysis on the target sensor dataset based on each of the non-target sensor datasets to determine a target sensitivity. This may be iteratively performed for all the sensors in the technical system to understand the sensor sensitivity for each of the sensors. This is further elaborated in the explanation to FIG. 10.

The deviation detection device 200 performs three main functions. The three main functions include: a. Neural Network based regression for detecting deviations of the actual sensor dataset from the predicted sensor dataset; b. Sensitivity analysis of the sensors used to develop the system model of the technical system for variable significance and quantifying sensitivities of sensor output; and c. Periodicity estimation of the deviations to predict the next occurrence of the subsequent deviation. An example of the method to perform the three main functions is provided as a flowchart in FIG. 3.

Figure 3:
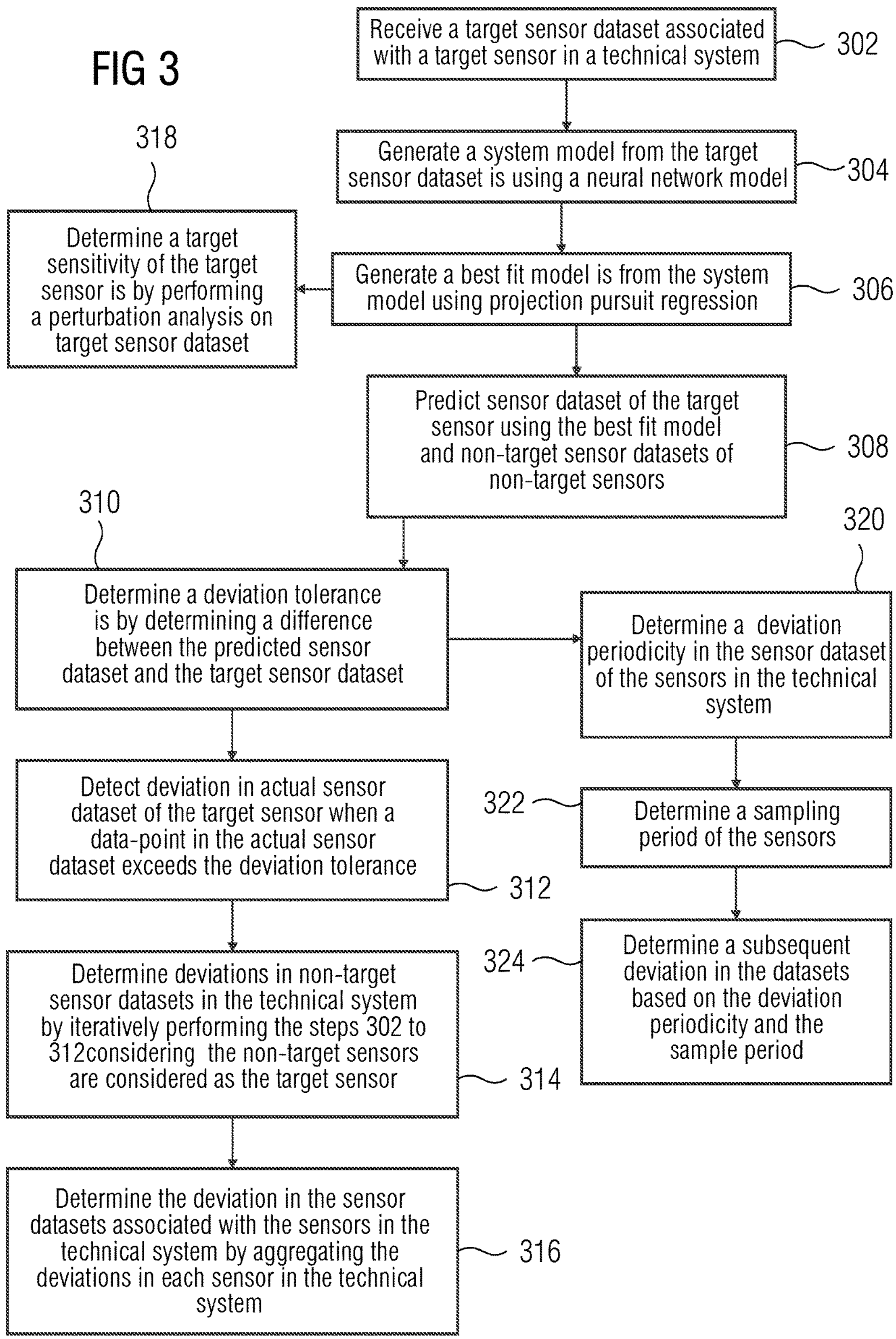
FIG. 3 is a flowchart illustrating one embodiment of a method for detecting deviation in one or more sensor datasets.

FIG. 3 is a flowchart 300 illustrating the method of detecting deviation in one or more sensor datasets, according to one or more of the present embodiments. The method begins at act 302 with receiving a target sensor dataset associated with a target sensor in a technical system. The technical system includes multiple sensors that generate the one or more sensor datasets. The target sensor is one of the multiple sensors in the technical system. The target sensor dataset is used as training data with which a system model for the technical system is built.

At act 304, a system model from the target sensor dataset is generated using a neural network model. In an exemplary embodiment, the neural network model is an Artificial Neural Network (ANN). At act 306, a best fit model is generated from the system model using projection pursuit regression. The projection pursuit regression includes an additive model that is fit to the data. The non linear functions are to be assumed in advance while the weights are determined when the best fit model is determined. In an exemplary embodiment, the best fit model is implemented with the ANN of a single hidden layer. The ANN minimizes a residual sum-of-squares (RSS) over the target sensor dataset to find the best fit model, with a back-propagation algorithm estimating the gradients for optimization.

At act 308, the predicting of the sensor dataset of the target sensor using the best fit model and non-target sensor datasets of non-target sensors is performed. Since the best fit model is generated using the target sensor dataset, the non-target sensor dataset is used to predict the values of the target sensor using the best fit model. This is possible considering that the sensors in the technical system are related by laws of physics.

At act 310, a deviation tolerance is determined by determining a difference between the predicted sensor dataset and the target sensor dataset. In an embodiment, the target sensor dataset is divided into a target training dataset and a test dataset. The target training dataset is used to generate the system model and the best fit model. The predicted sensor dataset is generated based on the target training dataset. The accuracy of the predicted sensor dataset is then determined by the difference between the test dataset and the predicted sensor dataset. This difference at each time instant is referred to as the deviation tolerance.

At act 312, deviation in the actual sensor dataset of the target sensor is detected when a data-point in the actual sensor dataset exceeds the deviation tolerance. Data-points of the actual sensor dataset are analyzed to determine whether the data-points exceed the deviation tolerance for the given time instant. If the actual data-point in the actual sensor dataset exceeds the deviation tolerance, deviation is detected. The deviation detected in the target sensor dataset may be a sensor deviation in the target sensor dataset or a prediction deviation in the predicted sensor dataset of the target sensor. In other words, the deviation is detected based on the deviation tolerance, which is based on the non-target sensor dataset there is a possibility of deviation in the non-target sensor dataset. Accordingly, the deviation in the actual sensor dataset may be attributed to either deviation in the actual sensor dataset or deviation in the non-target sensor dataset. This is further explained in FIGS. 7A, 7B and 7C.

At act 314, deviations in all the sensors in the technical system is determined by iteratively performing the above acts. Each of the non-target sensors are considered as the target sensor, and the best fit model for each sensor is generated. From the best fit model, the sensor values are predicted, and deviation in each non-target sensor dataset is determined.

At act 316, the deviation in all the sensor datasets is aggregated to determine a true list of all anomalies present in the sensor dataset associated with the sensors in the technical system. Accordingly, at act 316, deviations in the sensor dataset is determined by combining the deviations associated with each of the one or more sensors.

The above method may be divided into two phases as indicated in FIGS. 1A and 1B (e.g., the model fitting phase and the deviation detection phase). The best fit model generated at the end of the model fitting phase may also be used for sensor sensitivity analysis. Accordingly, at act 318, a target sensitivity of the target sensor is determined by performing a perturbation analysis on the target sensor dataset based on each of the non-target sensor datasets. The perturbation analysis allows study of changes in characteristics of a function when small perturbations are seen in the parameters of the function. In other words, the perturbation analysis refers to how a neural network output is influenced by input and/or weight perturbations (e.g., how the best fit model varies based on the changes in the non-target sensor datasets). In an embodiment, the perturbation analysis involves measurement of the sensitivities based on the evaluation of the Taylor Series Expansion (TSE) of the cost function that is the residual sum of squares (RSS), with appropriate approximations that are to be provided for the application. In an exemplary embodiment, approximation until the first derivative in the TSE is performed. This is explained further with the example of exhaust temperature sensor in FIG. 10.

The method allows for further analysis of the deviation tolerance at act 320. Sensor threshold for each of the sensors in the technical system is determined or known. The sensor threshold is compared with the deviation tolerance to determine a deviation periodicity. If the deviation tolerance is within the sensor threshold, the deviation tolerance is set to zero; accordingly, the deviation periodicity is determined at each instant when the deviation tolerance exceeds the sensor threshold. At act 322, a sampling period of the sensors is determined. In an embodiment, the sampling period of the sensors is already known. At act 324, a subsequent deviation in the one or more sensor datasets is determined based on the deviation periodicity and the sample period. This is further elaborated by the flowchart in FIG. 9.

Figure 4:
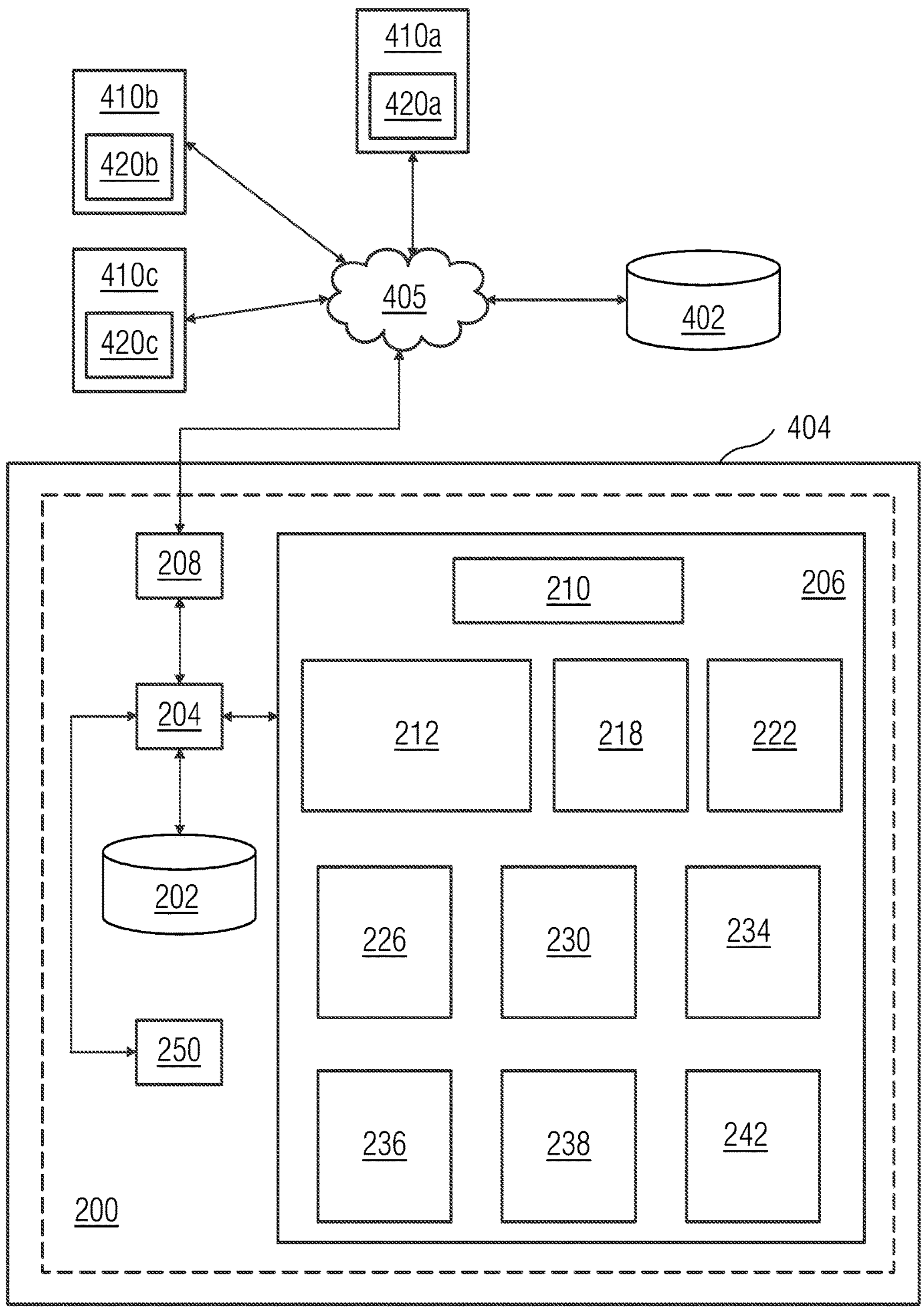
FIG. 4 is a block diagram of one embodiment of a system for detecting deviation in the one or more sensor datasets.

FIG. 4 is a block diagram of one embodiment of a system 400 for detecting deviation in the one or more sensor datasets. The system 400 includes a server 404 having the deviation detection device 200. The system 400 also includes a network interface 405 communicatively coupled to the server 404 and technical systems 410A-410C communicatively coupled to the server 404 via the network interface 405. The server 404 includes the deviation detection device 200 for detecting deviation detection in the sensor dataset associated with one or more sensors associated with the technical systems 410A-410C. The technical systems 410A-410C are located in a remote location while the server 405 is located on a cloud server, for example, using Google App engine cloud infrastructure of Google Inc., Amazon Web Services® of Amazon Technologies, Inc., the Amazon elastic compute cloud EC2® web service of Amazon Technologies, Inc., the Google® Cloud platform of Google Inc., the Microsoft® Cloud platform of Microsoft Corporation, etc. The technical systems 410A, 410B, and 410C include sensors 420A, 420B, and 420C, respectively. The sensors 420A, 420B, and 420C are used to generate one or more sensor datasets including sensor values corresponding to one or more operation parameters associated with the technical systems 410A, 410B, and 410C.

In case the server 405 is a cloud server, a system model and a best fit model may be fit on historic data associated with the operation of the technical systems 410A-410C. The historic data is saved in a database 402, which may be a cloud based database. The deviation detection is performed in real-time by receiving sensor datasets from the sensors 420A-420C. The deviation detection is performed iteratively on the sensors 420A-420C all at once.

Figure 5:
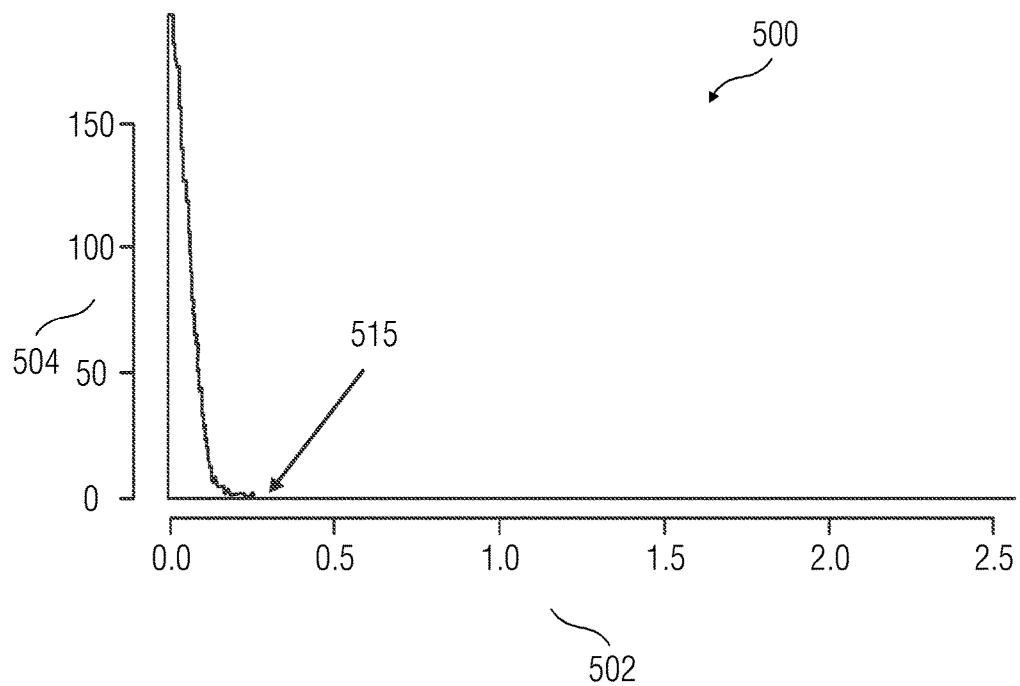
FIG. 5 is a graph an exemplary deviation tolerance for a sensor dataset.

FIG. 5 is an exemplary graph 500 of a deviation tolerance for a sensor dataset. According to the graph 500, on the x-axis 502 is a difference between the target sensor dataset and the predicted sensor dataset for a target sensor. As explained in FIG. 2, the target sensor dataset is used to generate the best fit model, and the predicted sensor dataset is generated from the best fit model and non-target sensor datasets. The difference is also referred to as the deviation tolerance.

The y-axis 504 indicates the number of times the deviation tolerance is repeated. As shown in the graph 500, the difference 0.2 is repeated the most number of times, as indicated at point 510. The graph 500 also indicates a highest deviation tolerance 515 at 0.4. The highest deviation tolerance may be used as a threshold to determine deviation. In other words, when data-points in the actual sensor dataset of the target sensor exceed the threshold, deviation is detected.

Figure 6:
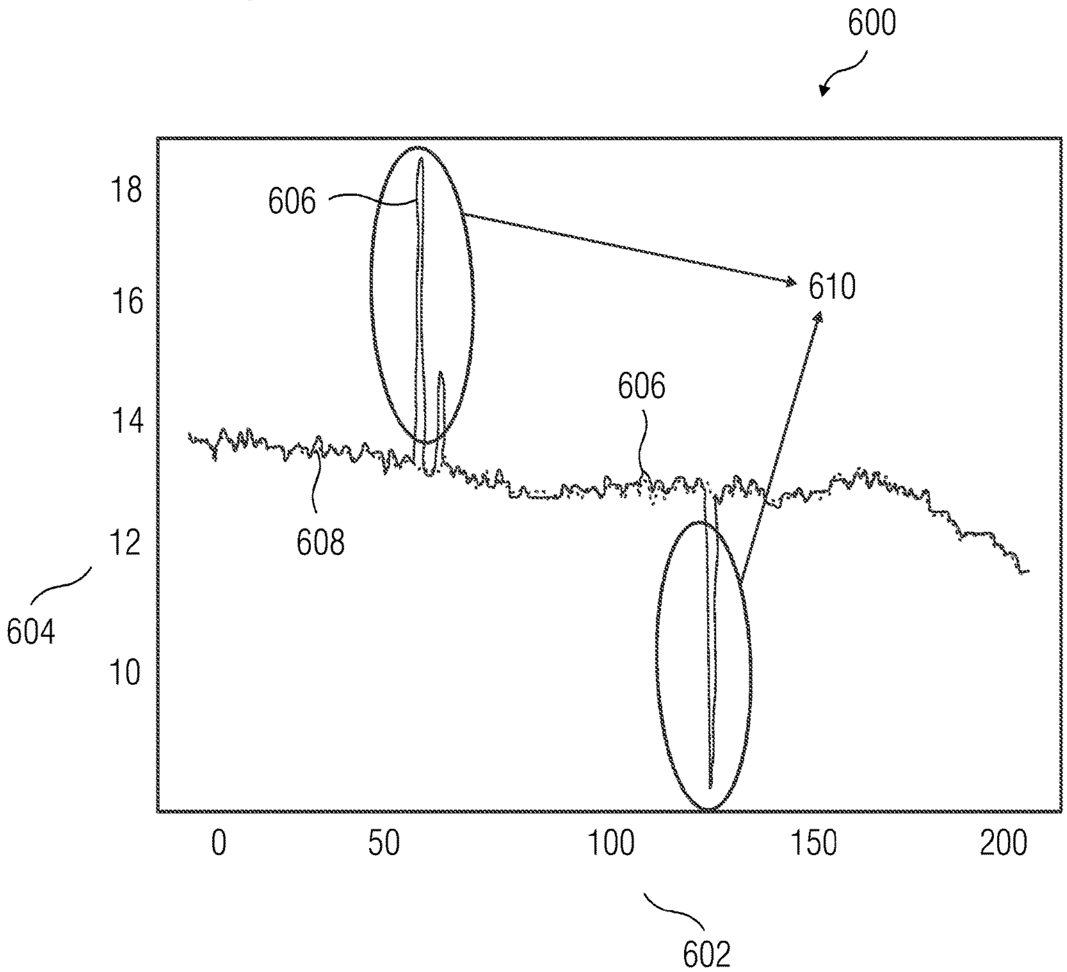
FIG. 6 is a graph illustrating exemplary deviations detected in a compressor outlet pressure dataset associated with a compressor outlet pressure sensor.

FIG. 6 is an exemplary graph 600 illustrating deviations detected in a compressor outlet pressure dataset associated with a compressor outlet pressure sensor. For the purpose of graph 600, the technical system is a gas turbine. The solid line 606 indicates the actual sensor dataset of the compressor outlet pressure sensor, while the dashed line 608 indicates the predicted sensor dataset of the compressor outlet pressure sensor. The x-axis 602 indicates the time instant, and the y-axis 604 indicates values of data-points in the actual sensor dataset 606 and the predicted sensor dataset 608. The spikes 610 in the actual sensor dataset 606 are deviations from the predicted sensor dataset 608. Accordingly, the spikes 610 are the deviations detected in the actual sensor dataset of the compressor outlet pressure sensor.

Figure 7A:
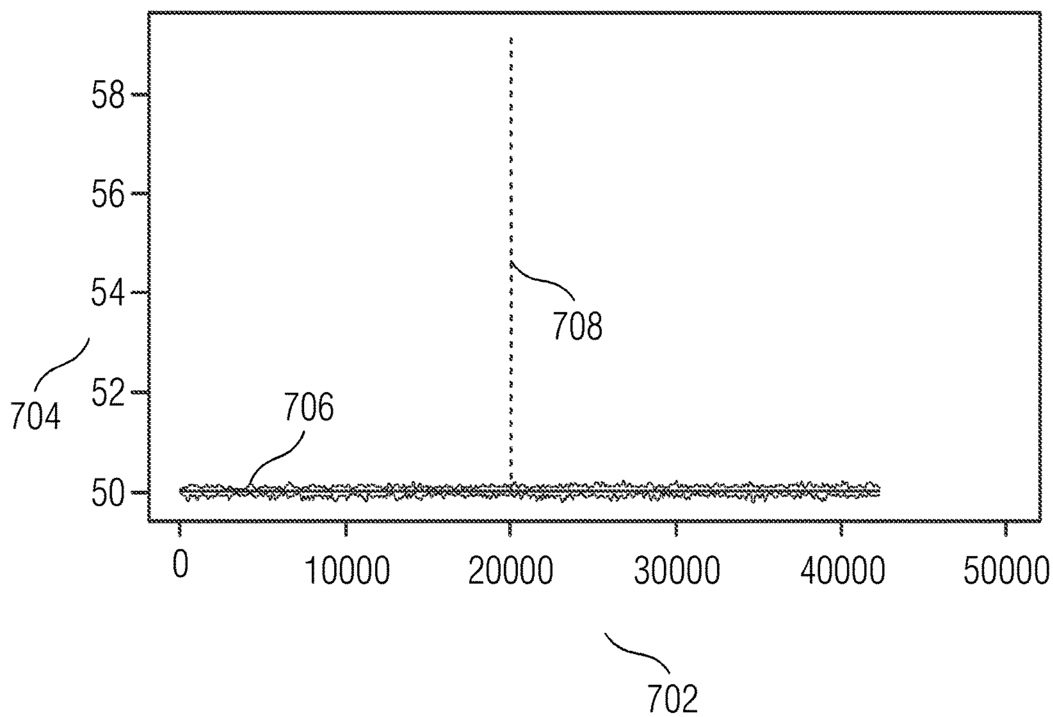
FIG. 7A is a graph illustrating an exemplary comparison of an actual sensor dataset and a predicted sensor dataset associated with a rotational speed sensor.
Figure 7B:
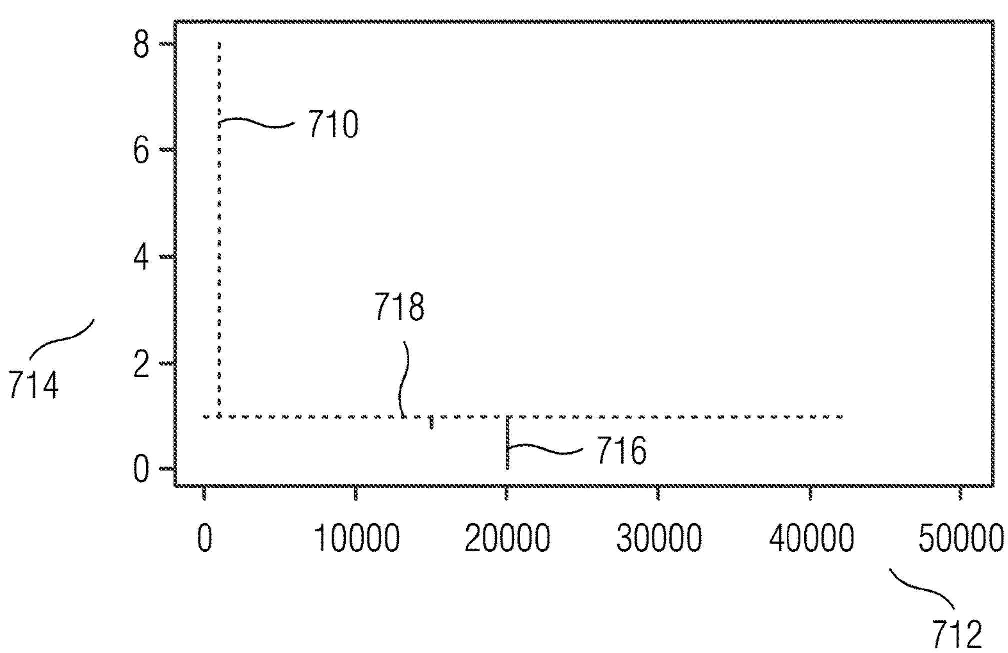
FIG. 7B is a graph illustrating an exemplary comparison of an actual sensor dataset and a predicted sensor dataset associated with a combustion flame sensor.
Figure 7C:
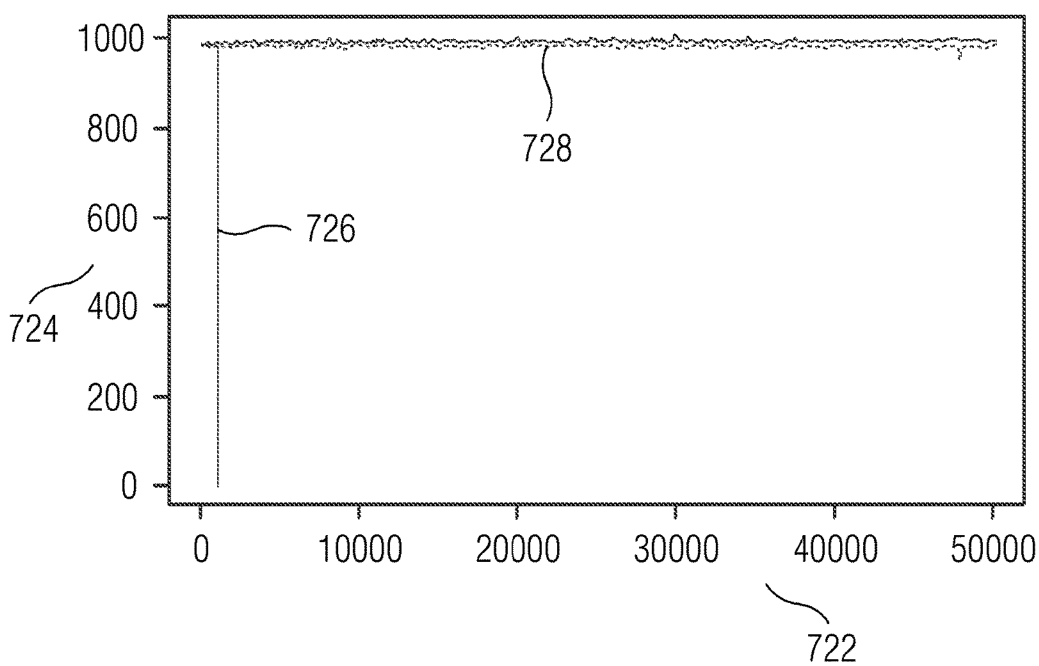
FIG. 7C is a graph illustrating an exemplary comparison of an actual sensor dataset and a predicted sensor dataset associated with a compressor inlet pressure sensor.

When deviation is detected in sensor datasets, the deviation may be of two types (e.g., deviation in the actual sensor dataset of the target sensor or deviation in the predicted sensor dataset of the target sensor). FIGS. 7A-7C illustrate the two types of deviations and the relationship between sensors in the technical system of a gas turbine.

FIG. 7A is a graph illustrating a comparison of the actual sensor dataset and the predicted sensor dataset associated with a rotational speed sensor. The x-axis 702 indicates the time, and the y-axis 704 indicates values of the actual sensor dataset 706 and the predicted sensor dataset 708 of the rotational speed sensor. As shown in the graph, there is a spike in the predicted sensor dataset 708. This indicates a deviation is the predicted sensor dataset. Deviation in the predicted sensor dataset 708 relates to deviation in sensor datasets associated with sensors apart from the rotational speed sensor as illustrated in FIG. 7B.

FIG. 7B is a graph illustrating an exemplary comparison of an actual sensor dataset and a predicted sensor dataset associated with a combustion flame sensor. The x-axis 712 indicates the time, and the y-axis 714 indicates the values of the actual sensor dataset 716 and the predicted sensor dataset 718 of the combustion flame sensor. The spike in actual sensor dataset 716 at time instant 20000 may be associated with the spike in the predicted sensor dataset 708 in FIG. 7A. Apart from the spike in the actual sensor dataset 716, the spike 710 is shown in the predicted sensor dataset 718. The spike 710 may be associated with a deviation in the sensor dataset apart from the combustion flame sensor, as indicated in FIG. 7C.

FIG. 7C is a graph illustrating an exemplary comparison of an actual sensor dataset and a predicted sensor dataset associated with a compressor inlet pressure sensor. The x-axis 722 indicates the time, and the y-axis 724 indicates values of the actual sensor dataset 726 and the predicted sensor dataset 728 of the compressor inlet pressure sensor. The spike in the actual sensor dataset 726 is comparable to the spike 710 in FIG. 7B. Therefore, the method of forming individual models on each sensor and iteratively using deviation detection for each sensor increases the robustness of the approach. If a deviation is missed by one model, the deviation is captured by another model from the set of developed models.

Figure 8:
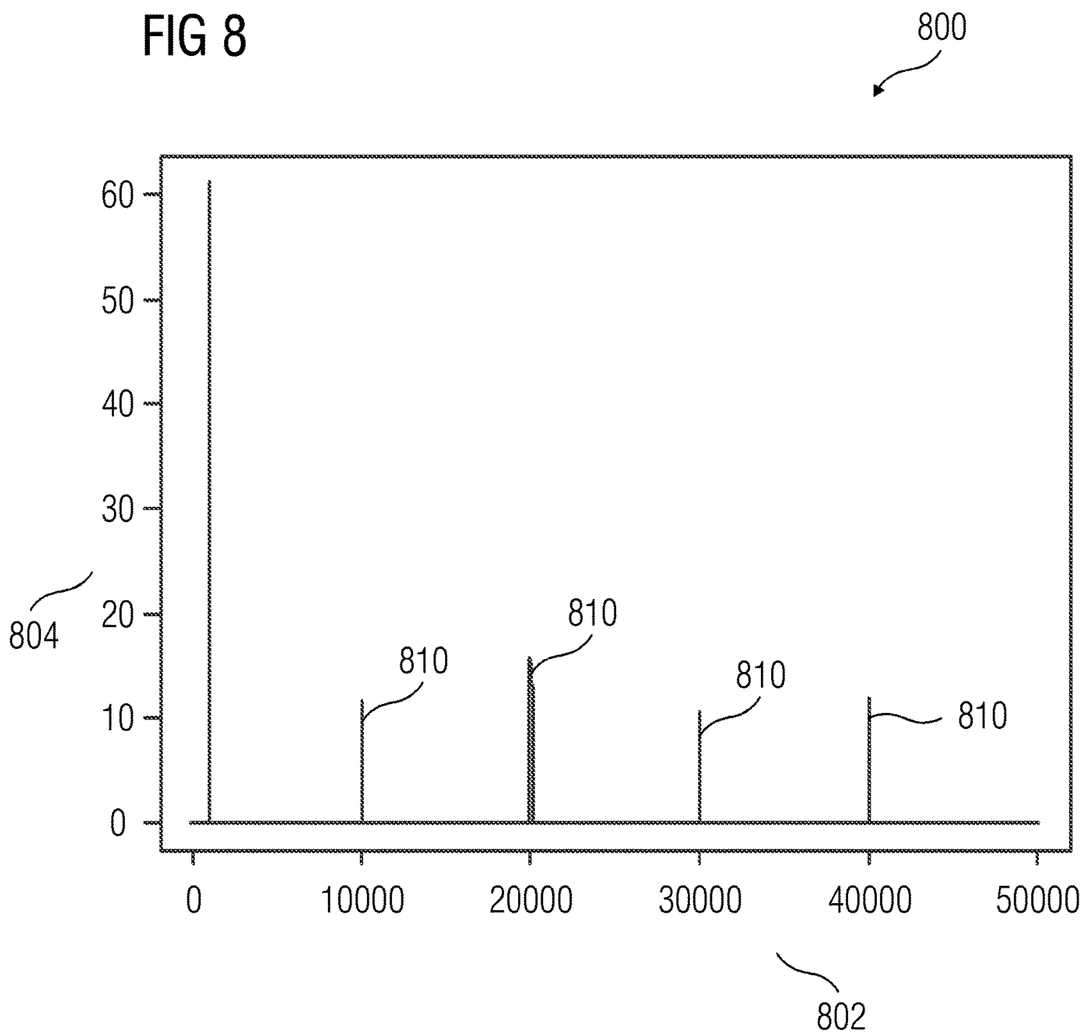
FIG. 8 is a graph 800 illustrating an exemplary deviation periodicity in an actual sensor dataset associated with an exhaust temperature sensor.

FIG. 8 is a graph 800 illustrating an exemplary deviation periodicity in an actual sensor dataset associated with an exhaust temperature sensor. Deviation tolerance of a predicted sensor dataset of the exhaust temperature sensor is determined. The deviation tolerance is compared with a sensor threshold associated with the exhaust temperature sensor. The sensor threshold may be determined based on laws of physics and from manufacturing specification of the exhaust temperature sensor. The x-axis 802 indicates the time, and the y-axis 804 indicates the deviation tolerance that exceeds the sensor threshold. The deviation periodicity 810 indicates periodic deviations occurring in the actual sensor dataset of the exhaust temperature sensor. The deviation periodicity 810 may be used to predict a subsequent deviation in the data generated by the exhaust temperature sensor. This is explained further by the flowchart in FIG. 9.

Figure 9:
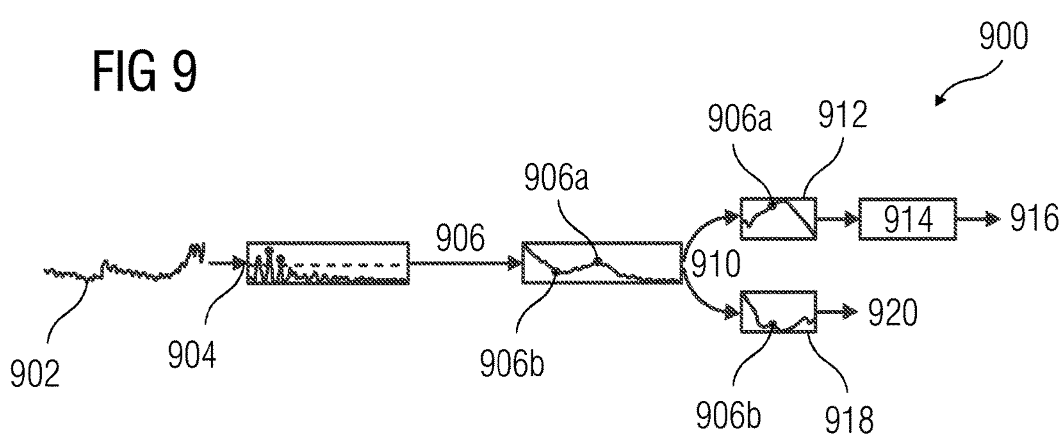
FIG. 9 is a flowchart illustrating one embodiment of a method for predicting a subsequent deviation in an actual sensor dataset associated with a target sensor.

FIG. 9 is a flowchart illustrating one embodiment of a method 900 of predicting a subsequent deviation in an actual sensor dataset associated with a target sensor. The actual sensor dataset 902 is received, and deviation periodicity 906 is determined from a deviation tolerance and a sensor threshold 904 associated with the target sensor. In an embodiment, the deviation periodicity 906 is determined based on the sensor threshold 904 determined from power spectral densities (PSDs) of permuted signals. The deviation periodicity 906 is applied on an auto-correlation function (ACF) 908. At act 910, curvature around the deviation periodicity falling on the ACF 908 is used to determine the subsequent deviation. If deviation periodicity **906*a* falls on a hill 912 of the ACF 908, then the deviation periodicity 906*a* is refined 914 to determine the subsequent deviation 916. If deviation periodicity 906*b* falls on a valley 918 of ACF 908, then the deviation periodicity 906*b* is dismissed as a false alarm 920**.

Figure 10:
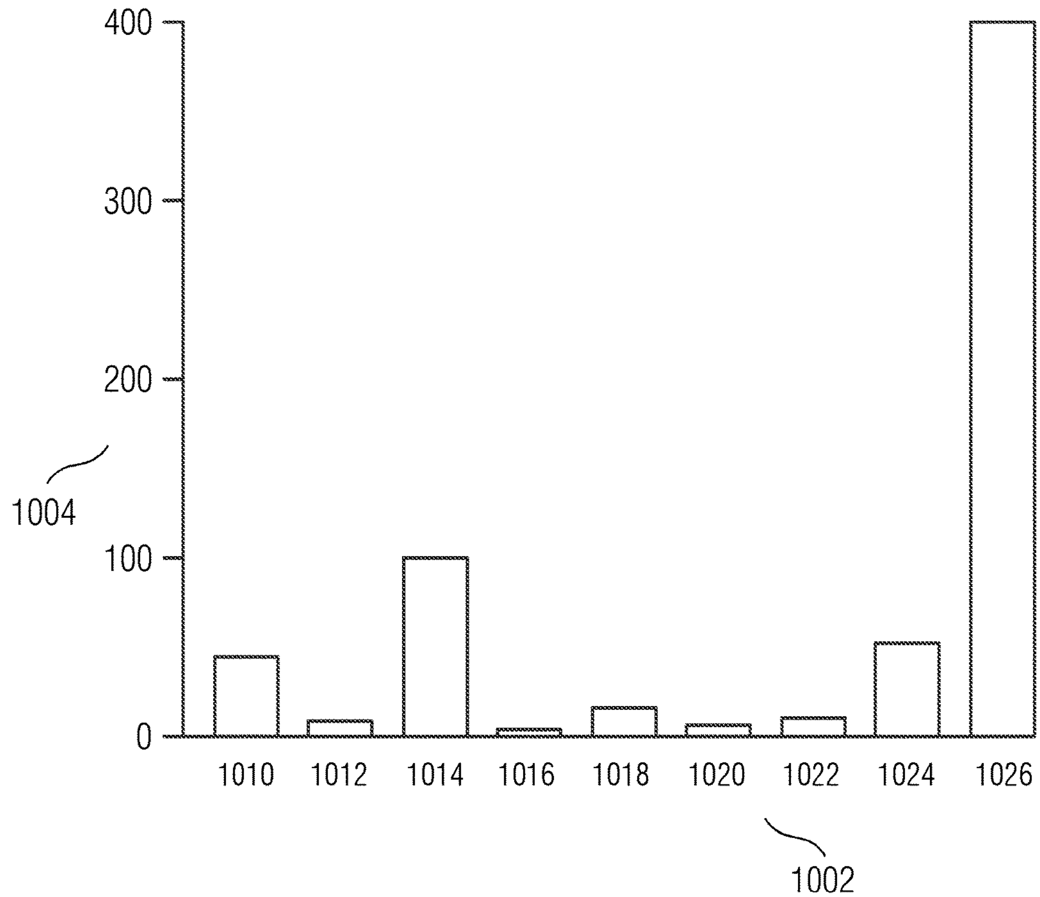
FIG. 10 is a graph illustrating an exemplary target sensitivity of a target sensor with respect to non-target sensors.

FIG. 10 is a graph 1000 illustrating an exemplary target sensitivity of a target sensor with respect to non-target sensors. For the purpose of the graph 1000, the target sensor is an exhaust temperature sensor of a gas turbine. The non-target sensors include a compressor inlet pressure sensor 1010, an inlet guide vanes sensor 1012, an inlet filter differential pressure sensor 1014, a feed pressure sensor 1016, a rotational speed sensor 1018, a compressor outlet temperature sensor 1020, an outlet temperature sensor 1022, a compressor inlet temperature sensor 1024, and a compressor outlet pressure sensor 1026.

The x-axis 1002 indicates the non-target sensors 1010-1026, and the y-axis 1004 indicates the target sensitivity of the exhaust temperature sensor with respect to the non-target sensors 1010-1026. As shown in the graph, the exhaust temperature sensor is most sensitive to the changes in the compressor outlet pressure sensor 1026, followed by the inlet filter differential pressure 1014 and the compressor inlet pressure sensor 1024.

The graph 1000 is especially beneficial in technical systems such as the gas turbines, as multiple sensors in the order of hundred may connected. The designing of such technical systems may be simplified by quantifying the relative importance of each sensor to a target sensor.

The various methods, algorithms, and modules disclosed herein may be implemented on computer readable media appropriately programmed for computing devices. The modules that implement the methods and algorithms disclosed herein may be stored and transmitted using a variety of media (e.g., the computer readable media) in a number of manners. In an embodiment, hard-wired circuitry or custom hardware may be used in place of or in combination with software instructions for implementation of the processes of various embodiments. Therefore, the embodiments are not limited to any specific combination of hardware and software. In general, the modules including computer executable instructions may be implemented in any programming language. The modules may be stored on or in one or more mediums as object code. Various aspects of the method and system disclosed herein may be implemented in a non-programmed environment including documents created, for example, in a hypertext markup language (HTML), an extensible markup language (XML), or other format that render aspects of a graphical user interface (GUI) or perform other functions, when viewed in a visual area or a window of a browser program. Various aspects of the method and system disclosed herein may be implemented as programmed elements, or non-programmed elements, or any suitable combination thereof.

Where databases including data points are described, alternative database structures to those described may be readily employed, and other memory structures besides databases may be readily employed. Any illustrations or descriptions of any sample databases disclosed herein are illustrative arrangements for stored representations of information. Any number of other arrangements may be employed besides those suggested by tables illustrated in the drawings or elsewhere. Similarly, any illustrated entries of the databases represent exemplary information only; one of ordinary skill in the art will understand that the number and content of the entries may be different from those disclosed herein. Further, despite any depiction of the databases as tables, other formats including relational databases, object-based models, and/or distributed databases may be used to store and manipulate the data types disclosed herein. Likewise, object methods or behaviors of a database may be used to implement various processes such as those disclosed herein. In addition, the databases may, in a known manner, be stored locally or remotely from a device that accesses data in such a database. In embodiments where there are multiple databases in the system, the databases may be integrated to communicate with each other for enabling simultaneous updates of data linked across the databases, when there are any updates to the data in one of the databases.

One or more of the present embodiments may be configured to work in a network environment including one or more computers that are in communication with one or more devices via a network. The computers may communicate with the devices directly or indirectly, via a wired medium or a wireless medium such as the Internet, a local area network (LAN), a wide area network (WAN) or the Ethernet, a token ring, or via any appropriate communications mediums or combination of communications mediums. Each of the devices includes processors, some examples of which are disclosed above, that are adapted to communicate with the computers. In an embodiment, each of the computers is equipped with a network communication device (e.g., a network interface card, a modem, or other network connection device suitable for connecting to a network). Each of the computers and the devices executes an operating system, some examples of which are disclosed above. While the operating system may differ depending on the type of computer, the operating system will continue to provide the appropriate communications protocols to establish communication links with the network. Any number and type of machines may be in communication with the computers.

The present invention is not limited to a particular computer system platform, processor, operating system, or network. One or more aspects of the present embodiments may be distributed among one or more computer systems (e.g., servers configured to provide one or more services to one or more client computers, or to perform a complete task in a distributed system). For example, one or more aspects of the present embodiments may be performed on a client-server system that includes components distributed among one or more server systems that perform multiple functions according to various embodiments. These components include, for example, executable, intermediate, or interpreted code that communicates over a network using a communication protocol. The present invention is not limited to be executable on any particular system or group of systems, and is not limited to any particular distributed architecture, network, or communication protocol.

The foregoing examples have been provided merely for the purpose of explanation and are in no way to be construed as limiting of the present invention disclosed herein. While the invention has been described with reference to various embodiments, it is understood that the words, which have been used herein, are words of description and illustration, rather than words of limitation. Although the invention has been described herein with reference to particular means, materials, and embodiments, the invention is not intended to be limited to the particulars disclosed herein; rather, the invention extends to all functionally equivalent structures, methods, and uses, such as are within the scope of the appended claims. Those skilled in the art, having the benefit of the teachings of this specification, may affect numerous modifications thereto, and changes may be made without departing from the scope and spirit of the invention in aspects.

The elements and features recited in the appended claims may be combined in different ways to produce new claims that likewise fall within the scope of the present invention. Thus, whereas the dependent claims appended below depend from only a single independent or dependent claim, it is to be understood that these dependent claims may, alternatively, be made to depend in the alternative from any preceding or following claim, whether independent or dependent. Such new combinations are to be understood as forming a part of the present specification.

While the present invention has been described above by reference to various embodiments, it should be understood that many changes and modifications can be made to the described embodiments. It is therefore intended that the foregoing description be regarded as illustrative rather than limiting, and that it be understood that all equivalents and/or combinations of embodiments are intended to be included in this description

The invention claimed is:

1. A method of deviation detection in at least one sensor dataset associated with one or more sensors in a technical system, wherein the one or more sensors comprise a target sensor and non-target sensors, the method comprising:

receiving a target sensor dataset associated with the target sensor in time series;

generating a best fit model of the technical system based on the target sensor dataset;

predicting a sensor dataset of the target sensor using the best fit model and non-target sensor datasets of the non-target sensors;

determining a deviation tolerance, the determining of the deviation tolerance comprising determining a difference between the predicted sensor dataset and the target sensor dataset;

detecting a deviation in an actual sensor dataset of the target sensor when a data-point in the actual sensor dataset exceeds the deviation tolerance; and detecting deviation in the at least one sensor dataset of the one or more sensors, the detecting of the deviation in the at least one sensor dataset comprises detecting deviation in each of the non-target sensor datasets.

2. The method of claim 1, wherein generating the best fit model of the technical system based on the target sensor dataset comprises:

generating a system model from the target sensor dataset using a neural network model; and generating the best fit model from the system model using projection pursuit regression.

3. The method of claim 1, wherein predicting the sensor dataset of the target sensor using the best fit model and the non-target sensor datasets of the non-target sensors comprises determining dot products of non-target data-points in the non-target sensor dataset with weight of the best fit model.

4. The method of claim 1, wherein determining the deviation tolerance comprises:

determining the difference between predicted data-points in the predicted sensor dataset with target data-points in the target sensor dataset for each time instant; and determining the deviation tolerance for each time instant based on the difference between the predicted data-points and the target data-points.

5. The method of claim 1, wherein detecting the deviation in the actual sensor dataset of the target sensor when the data-point in the actual sensor dataset exceeds the deviation tolerance comprises:

determining whether the data-point in the actual sensor dataset exceeds the deviation tolerance at each time instant; and detecting deviation in the actual sensor dataset when the data-point exceeds the deviation tolerance.

6. The method of claim 1, wherein detecting the deviation in the at least one sensor dataset of the one or more sensors comprises:

iteratively detecting deviation in each of the non-target sensor datasets, the iteratively detecting of the deviation in each of the non-target sensor datasets comprising considering the non-target sensors as the target sensor; and combining the deviations associated with each of the one or more sensors, such that the deviation in the at least one sensor dataset is detected.

7. The method of claim 1, wherein the deviation detected in the target sensor dataset is a sensor deviation in the target sensor dataset or a prediction deviation in the predicted sensor dataset of the target sensor.

8. The method as claimed in claim 7, further comprising determining the deviation in the non-target sensor datasets when the prediction deviation is determined, wherein the non-target sensor datasets and the target sensor dataset are convergeable to a deterministic function.

9. The method of claim 1 further comprising:

determining a deviation periodicity in the at least one sensor dataset of the one or more sensors;

determining a sample period for each of the one or more sensors; and predicting a subsequent deviation in the at least one sensor dataset based on the deviation periodicity and the sample period.

10. The method of claim 9, wherein determining the deviation periodicity in the at least one sensor dataset of the one or more sensors comprises:

determining a sensor threshold for each of the one or more sensors; and determining the deviation periodicity in the at least one sensor dataset when the deviation tolerance at each time instant exceeds the sensor threshold.

11. The method of claim 9, further comprising:

determining a circular correlation plot for the at least one sensor dataset;

determining whether the deviation periodicity falls on a hill or a valley of the circular correlation plot; and determining the deviation periodicity is true when the deviation periodicity falls on the hill and determining the deviation periodicity is false when the deviation periodicity falls on the valley.

12. The method of claim 1, further comprising determining a target sensitivity of the target sensor, the determining of the target sensitivity of the target sensor comprises performing a perturbation analysis on the target sensor dataset based on each of the non-target sensor datasets.

13. A deviation detection device for detecting deviation in at least one sensor dataset associated with one or more sensors in a technical system, the deviation detection device comprising:

a receiver configured to receive the at least one sensor dataset in time series;

at least one processor; and a memory communicatively coupled to the at least one processor, the memory comprising:

a model generator configured to generate a best fit model of the technical system based on the target sensor dataset;

a prediction module configured to predict a sensor dataset of the target sensor using the best fit model and non-target sensor datasets of non-target sensors;

a tolerance module configured to determine a deviation tolerance, the determination of the deviation tolerance comprising determination of a difference between the predicted sensor dataset and the target sensor dataset;

a sensor deviation module configured to detect deviation in an actual sensor dataset of the target sensor when a data-point in the actual sensor dataset exceeds the deviation tolerance; and a system deviation module configured to detect the deviation in the at least one sensor dataset of the one or more sensors, the detection of the deviation in the at least one sensor dataset comprising detection of a deviation in each of the non-target sensor datasets.

14. The device of claim 13, wherein the model generator comprises:

a system model generator configured to generate a system model from the target sensor dataset using a neural network model; and a best fit model generator configured to generate the best fit model from the system model using projection pursuit regression.

15. The device of claim 13, wherein the prediction module comprises a matrix module configured to determine dot products of non-target data-points in the non-target sensor dataset with weight of the best fit model.

16. The device of claim 13, wherein the tolerance module comprises a subtractor configured to determine the difference between predicted data-points in the predicted sensor dataset with target data-points in the target sensor dataset for each time instant, and wherein the deviation tolerance is determined for each time instant based on the difference between the predicted data-points and the target data-points.

17. The device of claim 13, wherein the sensor deviation module comprises a comparator configured to determine whether a data-point in the actual sensor dataset exceeds the deviation tolerance at a same time instant, and wherein the deviation in the actual sensor dataset is detected when the data-point exceeds the deviation tolerance.

18. The device of claim 13, wherein the system deviation module comprises a deviation aggregator module configured to iteratively detect deviation in each of the non-target sensor datasets, the iteratively detected deviation in each of the non-target sensor datasets comprising consideration of the non-target sensors as the target sensor, and wherein the detection of the deviation in the at least one sensor dataset comprises combination of the deviations associated with each of the one or more sensors.

19. The device of claim 13, wherein the memory comprises:

a period generator configured to determine a deviation periodicity in the at least one sensor dataset of the one or more sensors;

a sampling module configured to determine a sample period for each of the one or more sensors; and a deviation predictor configured to predict a subsequent deviation in the at least one sensor dataset based on the deviation periodicity and the sample period.

20. The device of claim 19, wherein the deviation predictor comprises a correlation module configured to:

determine a circular correlation plot for the at least one sensor dataset; and determine whether the deviation periodicity falls on a hill or a valley of the circular correlation plot, wherein the deviation predictor is configured to determine the deviation periodicity is true when the deviation periodicity falls on the hill and is configured to determine the deviation periodicity is false when the deviation periodicity falls on the valley.

21. The device of claim 13, wherein the memory comprises a sensitivity module configured to determine a target sensitivity of the target sensor, the determination of the target sensitivity of the target sensor comprising performance of a perturbation analysis on the target sensor dataset based on each of the non-target sensor datasets.

22. A system for detecting deviation in at least one sensor dataset, the system comprising:

a server operable on a cloud computing platform;

a network interface communicatively coupled to the server; and at least one technical system communicatively coupled to the server via the network interface, wherein the server includes a deviation detection device, the deviation detection device being configured to detect deviation in at least one sensor dataset associated with at least one sensor in the at least one technical system, the deviation detection device comprising:

a receiver configured to receive the at least one sensor dataset in time series;

at least one processor; and a memory communicatively coupled to the at least one processor, the memory comprising:

a model generator configured to generate a best fit model of the technical system based on the target sensor dataset;

a prediction module configured to predict a sensor dataset of the target sensor using the best fit model and non-target sensor datasets of non-target sensors;

a tolerance module configured to determine a deviation tolerance, the determination of the deviation tolerance comprising determination of a difference between the predicted sensor dataset and the target sensor dataset;

a sensor deviation module configured to detect a deviation in an actual sensor dataset of the target sensor when a data-point in the actual sensor dataset exceeds the deviation tolerance; and a system deviation module configured to detect deviation in the at least one sensor dataset of the one or more sensors, the detection of the deviation in the at least one sensor dataset of the one or more sensors comprising detection of deviation in each of the non-target sensor datasets.

* * * * *